(12) United States Patent
Tønnesland

(10) Patent No.: US 11,366,010 B2
(45) Date of Patent: Jun. 21, 2022

(54) ULTRA VIOLET LIGHT RADIATION SENSING DEVICE WITH RADIO COMMUNICATION, AND METHODS FOR CALIBRATION AND OPERATIONAL USE OF THE DEVICE

(71) Applicant: SUNSENSE AS, Hornnes (NO)

(72) Inventor: Åsulv Tønnesland, Hornnes (NO)

(73) Assignee: Sunsense AS, Hornnes (NO)

( * ) Notice: Subject to any disclaimer, the term of this patent is extended or adjusted under 35 U.S.C. 154(b) by 374 days.

(21) Appl. No.: 16/612,500

(22) PCT Filed: May 14, 2018

(86) PCT No.: PCT/NO2018/000010
§ 371 (c)(1),
(2) Date: Nov. 11, 2019

(87) PCT Pub. No.: WO2018/208166
PCT Pub. Date: Nov. 15, 2018

(65) Prior Publication Data
US 2020/0200597 A1    Jun. 25, 2020

(30) Foreign Application Priority Data
May 12, 2017    (NO) .................................... 20170783

(51) Int. Cl.
*G01J 1/42* (2006.01)
*G06T 7/80* (2017.01)
(Continued)

(52) U.S. Cl.
CPC ............. *G01J 1/429* (2013.01); *G01J 1/0474* (2013.01); *G06T 7/0014* (2013.01); *G06T 7/80* (2017.01);
(Continued)

(58) Field of Classification Search
CPC .. G01J 1/429; G01J 1/0474; G01J 2001/0257; G01J 2001/4266;
(Continued)

(56) References Cited

U.S. PATENT DOCUMENTS 9,068,887 B1    6/2015  Bennouri et al.
10,849,530 B2 *  12/2020 Tiwari ................... A61B 5/486
(Continued)

FOREIGN PATENT DOCUMENTS

| WO | 2015/101757 A1 | 7/2015 |
| WO | WO 2016178581 A1 | 11/2016 |
| WO | 2017/078268 A1 | 5/2017 |

OTHER PUBLICATIONS

International Searching Authority, International Search Report in counterpart International Application No. PCT/NO2018/000010, dated Sep. 25, 2019.
(Continued)

*Primary Examiner* — Kiho Kim
(74) *Attorney, Agent, or Firm* — Leydig, Voit & Mayer, Ltd.

(57) ABSTRACT

An ultraviolet light radiation sensing device to be wearable by a human being is provided, the device including a front part and a rear part, an ultraviolet light radiation sensor with associated microprocessor on a printed circuit board, a battery, and a wireless communication unit, e.g. for Bluetooth communication. If the front and rear part are made from a metal or metal alloy, and are interconnected by a middle member made from electrically insulating polymer material, the front and rear parts constitute antenna elements of the wireless communication unit. The device is intended to enable interaction with application data of a smartphone,
(Continued)

a method being provided to establish recommended UV-dose and related exposure time by the sun onto the skin of the human being.

4 Claims, 9 Drawing Sheets

(51) Int. Cl.

| | | |
|---|---|---|
| *G01J 1/04* | (2006.01) | |
| *G06T 7/00* | (2017.01) | |
| *H01Q 1/27* | (2006.01) | |
| *H01Q 9/04* | (2006.01) | |
| *H04B 1/3827* | (2015.01) | |
| *H04B 10/50* | (2013.01) | |
| *G01J 1/02* | (2006.01) | |

(52) U.S. Cl.
CPC ........... *H01Q 1/273* (2013.01); *H01Q 9/0471* (2013.01); *H04B 1/385* (2013.01); *H04B 10/502* (2013.01); *G01J 2001/0257* (2013.01); *G01J 2001/4266* (2013.01); *G06T 2207/10024* (2013.01); *G06T 2207/30088* (2013.01)

(58) Field of Classification Search
CPC ...... G01J 1/0219; G01J 1/0247; G01J 1/0271; G06T 7/0014; G06T 7/80; G06T 2207/10024; G06T 2207/30088; H01Q 1/273; H01Q 9/0471; H01Q 9/0407; H04B 1/385; H04B 10/502
See application file for complete search history.

(56) References Cited

U.S. PATENT DOCUMENTS

| | | | |
|---|---|---|---|
| 2004/0109789 A1* | 6/2004 | Faran | ........................ G01J 1/50 436/57 |
| 2015/0188217 A1 | 7/2015 | Tsai et al. | |
| 2016/0123802 A1* | 5/2016 | Likovich | ............... G01J 1/0219 356/221 |
| 2017/0133752 A1 | 5/2017 | Choi et al. | |

OTHER PUBLICATIONS

International Searching Authority, Written Opinion in counterpart International Application No. PCT/N02018/000010, dated Sep. 25, 2019.

\* cited by examiner

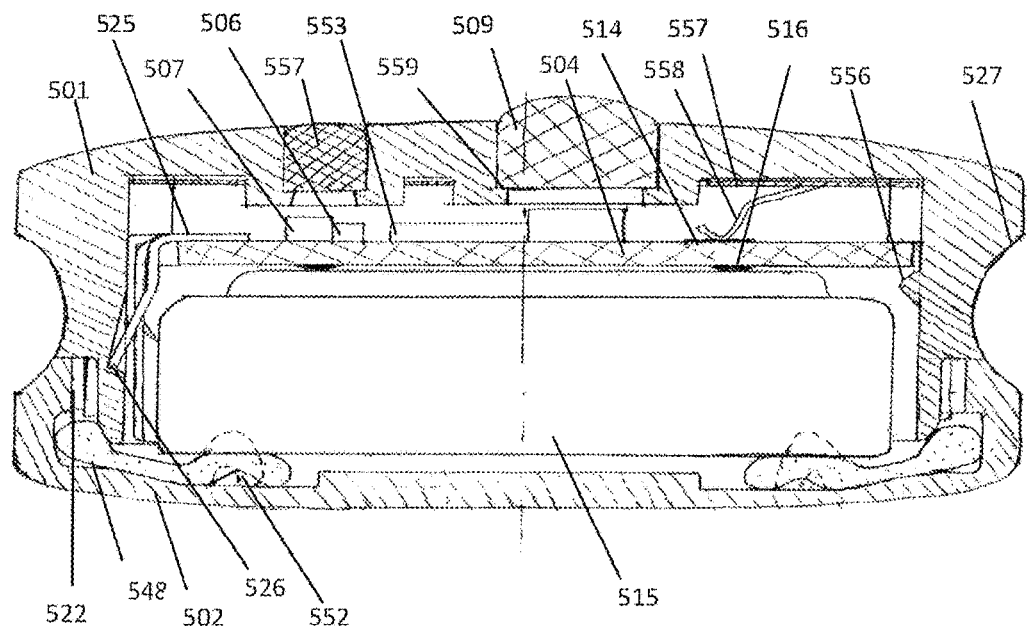
Fig.5
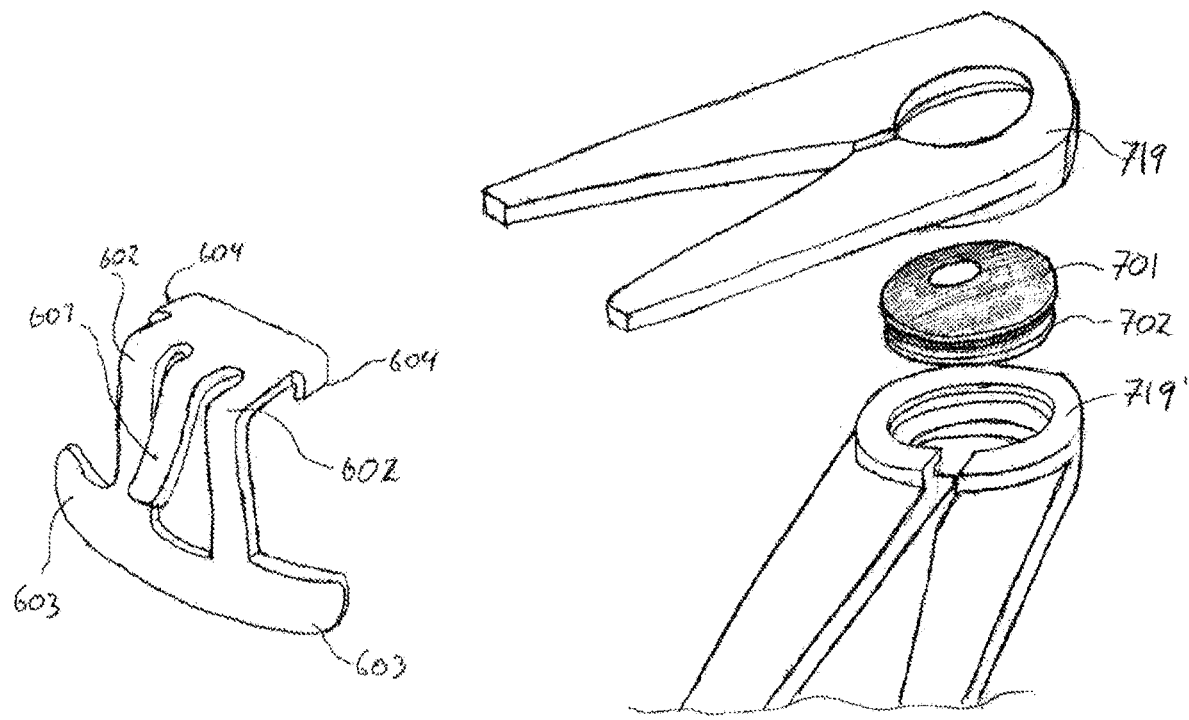
Fig.6
Fig.7

ULTRA VIOLET LIGHT RADIATION SENSING DEVICE WITH RADIO COMMUNICATION, AND METHODS FOR CALIBRATION AND OPERATIONAL USE OF THE DEVICE

CROSS-REFERENCE TO RELATED APPLICATIONS

This patent application is the U.S. National Stage of International Patent Application No. PCT/NO2018/000010, filed May 14, 2018, which claims the benefit of Norwegian Patent Application No. 20170783, filed May 12, 2017, which are each incorporated by reference.

BACKGROUND OF THE INVENTION

The present invention relates to an ultraviolet light radiation sensing device to be wearable by a human being, the device including a front part and a rear part, an ultraviolet light radiation sensor with associated microprocessor on a printed circuit board, a battery, and a wireless communication unit, e.g. for Bluetooth communication. The present invention relates to a method of calibrating sun exposure features and determining skin-type of a human being in application data of a smartphone cooperative with an ultraviolet light sensing device. Further, the present invention relates to a method of providing improved conservative warning to a human being of accumulated ultraviolet exposure to regions of the body of the human being. Still further, the present invention relates to calculating solar height an UVB/UVA ratio. Also, the present invention relates to a method of establishing a secure wireless connection between a wearable or other Bluetooth-equipped device implementing ultraviolet sensors and a smartphone. In addition, the present invention relates to a method of matching identity of a wearable wireless ultraviolet sensing device to a central database of identity numbers.

In the following description, ultraviolet light will be abbreviated into UV, microprocessor will be expressed by µP, and printed circuit board will be abbreviated into PCB.

Health risks and diseases which are closely linked to overexposure to UV radiation has been steadily increasing for many years. Further, repeated overexposure to UV radiation has been linked to conditions such as actinitic keratosis, premature skin ageing and other skin damages, cataracts, non-melanoma skin cancer and malignant melanoma skin cancer. Although there is a growing public focus and awareness on these issues, research shows that a large portion of overexposure and sunburn cases occur when people are attending multiple outdoor activities and do not know or ignore the UV intensity. Further, most people do not keep track on accumulated exposure, and many do not use sun-protective clothes and headwear, nor use efficient sunglasses/sunscreen and/or use body lotion with sufficient "sunscreen-factor".

Furthermore, exposure to visible light in the blue spectrum or daylight, has been shown to have many positive psychic health effects on circadian rhythms, melatonin levels, insomnia, premenstrual syndrome and seasonal affective disorder and more. Especially in regions with little daylight during winter or with people living and working indoor without normal exposure to outdoor light, controlling and maintaining a healthy level of daylight exposure is important.

The present invention is therefore intended to provide a particularly compact, battery operated device capable of efficiently providing an indication of accumulated UV-dose, optionally also blue or visible light, received by the skin of the human being and capable of alerting the human being when a specified dose is reached or about to be reached.

PRIOR ART

There are multiple varieties of battery powered UV sensor devices or UV dosimeters on the market. Most of these are intended to be worn on the wrist like a watch. There are however significant shortcomings of this solution as depending on user activities, the wrist may have much lower UV-exposure than other parts of the body, i.e. head, shoulders, back, thighs or chest. To better measure the actual exposure of the more exposed areas of the body, the device must be possible to attach and wear on these areas. It is also desirable to have a long operating time between charging or battery replacement. The dosimeter must provide means for user input to switch it on, but also other operations/functions like ensuring connection to a correct mobile phone if using Bluetooth connection or setting limit values in a µP therein, reset the device or trigger the µP to show currently received dose or alert upon certain levels. Interaction with similar "wearable" devices is commonly done by push buttons or capacitive touch sensors.

Measuring UV-radiation requires special materials to be used in front of the sensing component in order to transmit and diffuse the radiation correctly. These requirements pose particular challenges for common production processes like injection molding and gluing, for assembly, waterproofing, size- and cost reduction.

Special attention must be made to avoid leakage of water into the device via switch buttons, battery covers, sensor windows or other openings, as such devices will often be subjected to water. These requirements have caused prior known UV-sensor devices for personal use to be one or more of the following: bulky, inaccurate, not waterproof, expensive, uncomfortable.

In order to provide the user recommendations for maximum sun exposure, use of sunscreen protection factors to avoid sunburn or calculate vitamin-D generated, it is necessary to know each individual user's skin type. Apart from expensive medical-grade equipment there are no known accurate solutions for quantifying this. Common practice is to use a questionnaire which has significant limitations.

In order for a user to operate such a dosimeter, there is commonly provided one or more push button switches on the dosimeter to switch the dosimeter on or off, and/or operate functions of a microprocessor therein.

Such switches contribute to the overall cost and complexity of the device, as they often occupy too much space in the device and contribute to an undesirable dimensional increase of the device, device thickness. This will easily result in the device being less suitable for a discrete, flexible and convenient way of wearing or placement at sun-exposed and suitable locations on the body of the user.

Further, mechanical housing on such wearable devices with wireless communication, i.e. Bluetooth, is commonly made of plastic material transparent to radio waves. If made from metal, an opening allowing for transmission of radio waves has been provided. The use of common Bluetooth/2.4 GHz antennas normally dictates these to be placed at some distance from the metal can of the battery, thereby typically adding to the overall size of the device Different wavelengths of the ultra violet radiation spectrum have different effects on the human skin. To quantify and compare the total damaging effect of ultraviolet radiation on human skin the erythema action spectrum has been defined and is internationally recognized. Low-cost UV-sensors commonly found in commercially available, wearable UV-sensors typically deviates considerably from this action spectrum. Together with deviations in gain and angular response this often causes poor measurement accuracy.

A compact UV light radiation sensing device is known from WO2016/178,581, which is stand-alone device.

Another UV light radiation detection device which communicated with a smartphone, preferably an iPhone, is marketed by an Internet operating company "JUNE by netatmo" (junebynetatmo.com), communication between the device and an iPhone being aided by Bluetooth transmission, the device using a chip-antenna.

Further, there is described a personal UV radiometer in U.S. Pat. No. 5,008,548, a solution for using an external housing as part of an antenna in WO 2017/078268 A1, a method of camera based skin type detection in U.S. Pat. No. 9,068,887 B1, and a wearable UV-dosimeter with metal housing transparent to radio waves in WO 2015-101757 A1.

OBJECTS OF THE INVENTION

It is an object of the present invention by simple and low cost means to produce a particularly small size and discrete device for accurate measuring UV-exposure to a human body that is ergonomically good and practical to wear while conducting a wide variety of everyday activities.

It is an object of the present invention to eliminate a need for one or more mechanically button-operated switches in the device to reduce overall size of the device, reduce number of structural components and components for antenna, allow for the use of a metal housing, provide a waterproof housing with a battery easy replaceable by user, and to simplify manufacturing assembly operations.

The invention provides a method of modifying the angular response of common surface mount sensors to yield better practical tracking of sun exposure from a sensor device worn on the body. It also provides a method of using a mobile phone for correcting errors in the output from common low cost UV-sensors due to atmospheric conditions and solar height.

It is another object of the present invention to provide a means for connecting the sensing device to and verifying connection with a specific Bluetooth enabled unit like a smart-phone without user input means like buttons or switches.

It is an even further object of the invention to provide a more accurate and automated method of quantifying a user's skin type to be used for estimating tolerance level of UV-radiation before erythema or sunburn.

The invention also provides a method of providing customized user interface or in-app advertisements based on where a connected Bluetooth device have been purchased

SUMMARY OF THE INVENTION

Inventive features of the invention appear from the independent claim. Further embodiments of the invention appear from the related sub-claims.

The features of the independent claim are related to the currently preferred method.

Inventive features of the method of the invention appear from the independent claim. Further embodiments of the method appear from the related sub-claims.

The device mentioned has two metal covers attached together by threads or a snap feature to allow for replacement of battery. A middle member may enable interconnection between these metal covers.

A Normally Open or Normally Closed shock-sensor or piezo-ceramic device will upon a tapping force applied onto the device enable delivery of an electric voltage signal to the microprocessor via the printed circuit board to wake up the microprocessor from a power saving sleep mode and/or for input to the microprocessor as a function of tapping sequences interpretable by the microprocessor. The design of one or two plastic parts in connection with said metal covers allows for a diffusor window in such plastic part(s) for the optical sensors, waterproofing of the device and an electrical and capacitive insulation of the two metal covers in order to utilize these as elements of a conformal antenna. This is an integral part of the invention because physical limitations makes achieving good antenna performance difficult when total product size becomes this small and when metal covers are to be used.

The invention will now be more fully appreciated from the following description with reference to the attached drawing figures, showing a preferred, yet not limiting embodiment of the invention.

BRIEF DESCRIPTION OF THE DRAWINGS

FIGS. 2, 3, 4 and 5 show vertical cross sectional-views through different embodiments of the device.

FIG. 6 shows a battery contact spring as provided in the embodiment of FIGS. 2, 3, 4 and 5.

FIG. 7 shows a tool for opening the device for battery replacement.

FIG. 8 shows a method of pairing the device with a smartphone and identity confirmation without the need for user input on device buttons and like.

DETAILED DESCRIPTION

Figure 1A:
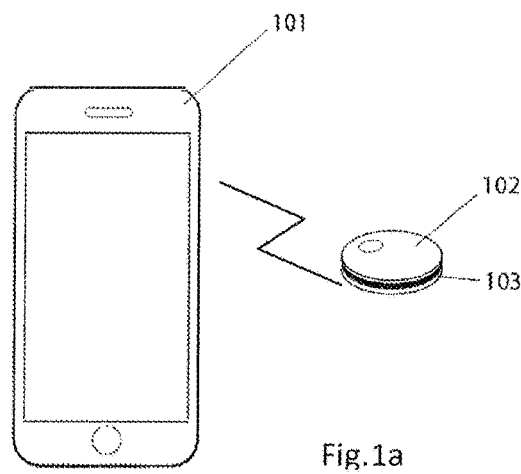
FIG. 1a is an illustration of the inventive sensing device indicated to be capable of communication with a smartphone, e.g. an iPhone or Android based cellular phone.
Figure 1B:
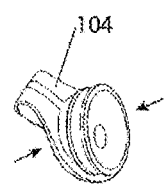
FIG. 1b shows the sensing device with a clip-on or attach-to-a clothing-button accessory.
Figure 1C:
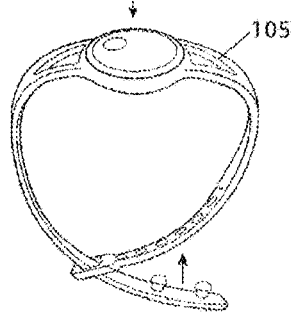
FIG. 1c shows the sensing device as attached to a hand wrist accessory.
Figure 1D:
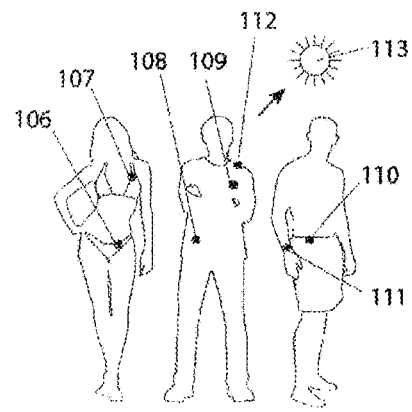
FIG. 1d shows how the device with its proper accessory is attachable to a human being or the clothing worn by the human being.

Minimizing the physical size of the device is of crucial importance as this allows for comfortable wearing on various parts of the body as illustrated in FIG. 1. The device 102 is equipped with a groove 103 for easy snap-fit into various wearing accessories like a clip 104 or a strap 105. The user can then easier choose a place for attaching the device 106, 107, 108, 109, 110, 111, 112 that depending of the activity will have the sensor pointing in the direction of the sun 113 most of the time and hence measure total exposure similar to the most exposed parts of the body.

This document describes design principles for a waterproof, compact, battery-operated wearable device equipped with one or more sensors for measuring and calculating accumulated dose of electromagnetic radiation in the UVA and UVB range, potentially also visible-light range. The invention describes mechanical and electromechanical solutions to minimize the total volume of the device maintaining ease of production, low part count, ease of battery replacement, two-way user interface in addition to a high sensitivity antenna for 2.4 GHz Bluetooth radio communication with smartphone.

Figure 2:
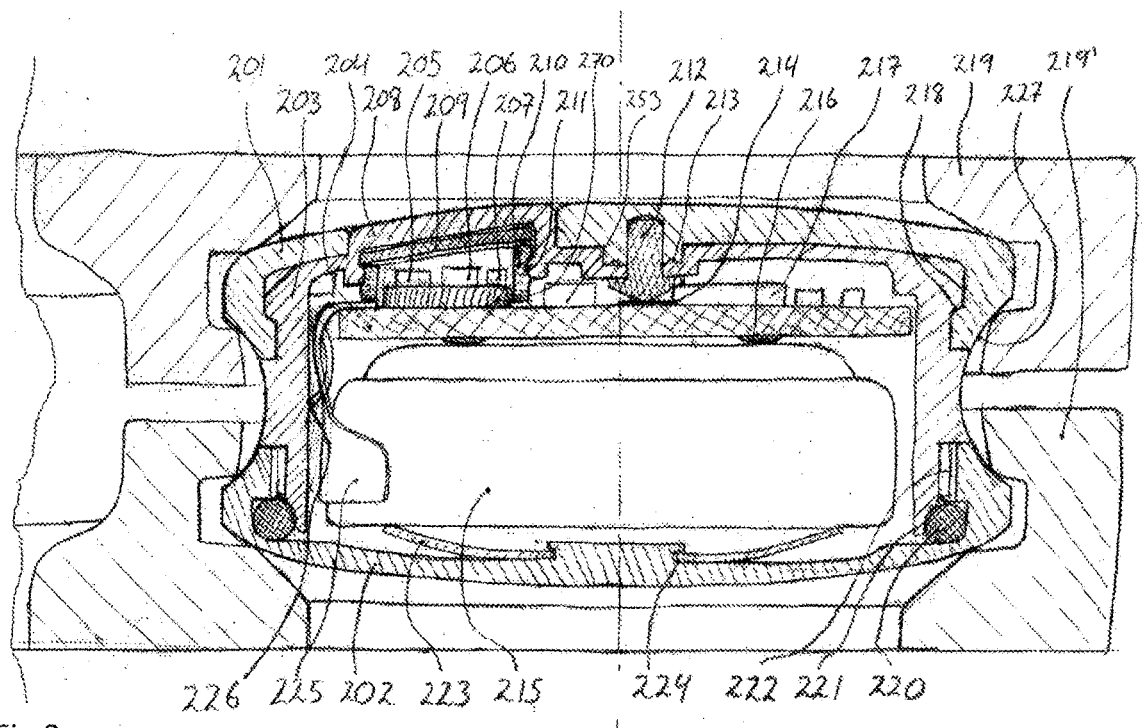

The implementation shown in FIG. 2 has a front part (top cover/casing) 201 housing a printed circuit board (PCB) 204 holding a sensor for ultraviolet radiation 205. Powering the unit is a coin-cell battery 215 contacting directly to pad(s) 216 on the printed circuit board and via a contact spring 225 to the positive pole. A spring 223 pushes the battery against the contact pads on the PCB 204. Optionally the contact spring 225 can contact a rear part or bottom cover/casing 202 if this is conductive and electrically connected to the battery.

The implementation shown has the benefit of connecting the different parts electrically with no use of wires or manual soldering to enhance production efficiency.

Further the implementation shown has a benefit over other known solutions in that it requires a minimum of height in addition to the primary components being the printed circuit board with its Surface Mount Device—components and the battery. Only the thickness of a spring material, typically 0.2 mm and attachment is added. Furthermore, the implementation shown has the benefit of reducing the outside diameter dimension to a minimum addition to the battery diameter while still providing open-close functionality, watertight sealing and external geometry 227 for attaching the device to different holders and accessories. Previously known designs of similar functionality have been of significantly bigger size and with a smaller portion of the volume utilized for battery.

The invention is particularly useful in the implementation of a wearable, battery powered UV-sensor/dosimeter in that such a product can be stored for several months between use, and that the compact implementation and reduced power consumption and battery requirement allows the overall product to be made smaller and more attractive than would otherwise be possible.

A radio communication (typically Bluetooth) is used to communicate with a smartphone that provides a graphical user interface (GUI) and audible alarms for the UV-sensor. An important part of the invention is the integrated, so-called conformal antenna solution for a particularly compact and small metal enclosed wearable UV-sensor. Getting sufficient 2.4 GHz radio range on such small devices is a common problem and if the housing is to be made of metal. The latter is often desirable for reasons of ruggedness and cosmetics. Furthermore, when for reasons of compactness the diameter of PCB is close to the diameter of Battery, there will be no area for an antenna on the PCB that can easily be made without a ground plane underneath as the battery metal container will work as a ground plane independently of PCB design. A minimum distance to ground plane is a common requirement for printed or ceramic substrate/chip-type antennas. Conformal antennas are known from other Bluetooth devices, but in significantly bigger and more complex, high part-count implementations. Other known variations of active antenna elements integrated as part of the metal housing of a compact wearable device are comprised of splitting the metal cover into several electrically insulated segments. Such solutions are significantly more complex and expensive to produce.

An important part of the external, functional design is the circumferential groove 227, 327 that is used for mounting the device into different wearing accessories like elastic wrist straps or clips by snap-fit.

Mechanical Design/Embodiment

FIGS. 2, 3, 4, and 5 describe alternative electromechanical embodiments of the device. Details are referenced with 3-digit numbers where the first digit refers to the Figure number. Surfaces of front and rear parts, i.e. top and bottom covers of a device housing are suitably flat or slightly curved and transition into vertical sidewalls constituting an overall outwardly convex shape. The main surfaces, both inside and outside, are rotational symmetric and well suited for an efficient, lathe-based production of the device. Outside diameter of the device housing is in the range of 20-29 mm and a front or top surface curvature radius is 60 mm or more.

To achieve large enough antennae and ground plane for a 2.4 GHz radio, ensuring sufficient sensitivity and range, a metal front part or top cover 201, 301 401, and rear part/bottom cover 202, 302, 402 are used as elements of a capacitive type conformal antenna design where the two metal parts are separated by 1-4 mm by a plastic middle piece 203, 303, 403. A metal contact pin 212 connects antenna signal from PCB to front part or top cover 202, 302, 402. It is critical to antenna function and longevity to avoid oxidation on antenna-related contact surfaces. This poses a particular issue if the front part or top cover is made from aluminum which is a commonly preferred material for reasons of price, convenient machining, weight and the application of scratch resistant anodizing surface treatment. A central part of the invention embodiment shown in FIG. 2 is the use of a gold-plated contact pin 212, press-fit into the front part or top cover 201, eliminating the need for expensive secondary surface treatment of the front part or top cover 201 to ensure good electrical contact. The contact pin 212 contacts the PCB via a gold-plated contact pad 214. Contact pressure is provided by a disc spring 223, also providing contact force between battery 215, 315, 415, 515 and contact pads 216, 316, 416, 516 on PCB underside.

Figure 3:
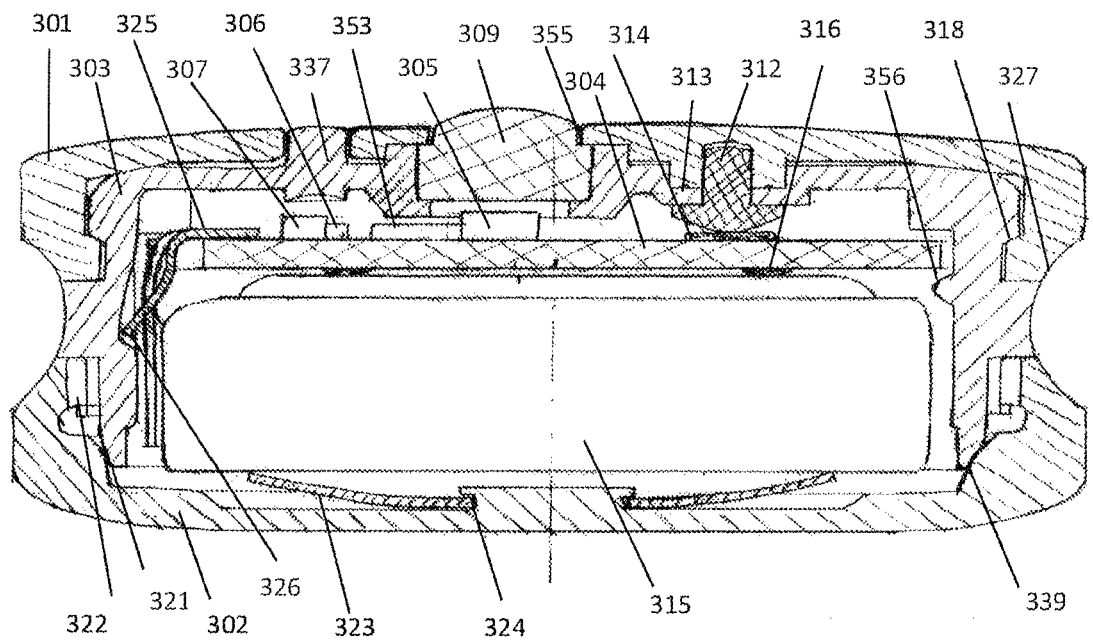

In the embodiments shown in FIG. 2 and FIG. 3, the contact pin 212, 312 has a double function in that it also presses a sealing rib 213, 313 of the plastic middle piece part 203, 303 against front part or top cover 201, 301 to provide a high-pressure tolerant sealing against water ingress.

Employing a more commonly used resilient contact spring as a contact element between PCB and front part/top cover is considered an inferior solution partly because passing it through the middle member 203, 303 maintaining waterproofing would be difficult, and partly because producing such a part rigid enough to be press-fitted into the metal front part/top cover 201, 301, 401 and at the same time resiliently flexible enough to provide an ample contact pressure over a distance of mechanical tolerances in height of the assembled PCB, would be difficult to achieve in practice. Separation of a contact force providing member from an electrically contact providing member by allowing the entire stack of PCB and the battery to move vertically inside the external housing, is an advantageous solution in the present device.

The rear part/bottom cover 202, 302, 402, 502 is connected capacitively or directly to the battery 315, 415, 515 and further capacitively through the battery to the PCB battery contact pads 216, 316, 416, 516 and electrically acts as a main ground member in the antenna system.

The disc spring 223, 323, 423 is snap-fit mounted onto a boss and groove 224, 324, 424 to center it and to prevent it from falling out during battery replacement. An alternative embodiment makes use of an integral combined disc spring 552 and compressible gasket 548 made of a resilient polymer material.

A firm connection between middle piece 203, 303, 403 and front part/top cover 201, 301, 401 can be achieved by a snap feature 218, 318, 418 or by glue. In embodiments shown in FIG. 4, a waterproof seal between middle piece 403, and top cover 401 is required and is achieved by O-ring 434. or glue in the same area.

The invention shows two possible embodiments for enabling the user to easily change the battery by removing the rear part/bottom cover 202, 302, 402, 502 using snap-fit 438, 441 or threads 222, 322 522. In case of snap-fit, detaching rear part/bottom cover is done by prying open using a flat, screwdriver-like tool 436 inserted into a slot 435 cut into the middle piece 403. In case of threads, the rear part/bottom cover can be opened using two similar, single piece plastic pliers 219, 219', 719, 719' that are placed over front part/top cover 701 and rear part/bottom cover 702 respectively and squeezed by hand as the rear part/bottom cover is unscrewed. The pliers have a groove to fit the outer contours of the device front/top and rear/bottom cover, and the contact point angle provides ample grip.

In order to power up, initiate pairing sequence and provide user-input functionality to a battery operated, wearable device like this without using an already established radio communication link, commonly used solutions are mechanical buttons/switches, capacitive and resistive sensors. All of them requiring a quite large area/volume and physical implementation, and the latter two drawing power when not used. A surface-mount type piezo-ceramic based impact sensor or accelerometer component 253 is used to detect a tap onto the device and activate a predefined sequence of commands by the μP, such as denoted by 317 on FIG. 2. A μP and piezo-ceramic sensor or accelerometer component is not shown on FIGS. 3, 4 and 5 for sake of clarity, but will be present on the PCB of all device embodiments shown on these FIGS. 3-5, as is evident from inter alia FIGS. 9 and 11.

An important part of the invention is the design and utilization of a capacitive type conformal antenna as an integral part of the product structure allowing good antenna range from a minimal size device where a coin cell battery takes up a majority of the volume, using the metal covers as active antenna elements, the front part (top cover) 201, 301, 401 electrically connected to the antenna circuitry on the printed circuit board 204, 304 404 via one or two contact pin(s) 212, 312, 412, the battery 215, 315, 415 contributing to ground plane and capacatively connecting the rear part (bottom cover) 202, 302, 402, 502 to the printed circuit board mounted antenna circuit electrical ground via the contact pads 216, 316, 416, 516. With a plastic front part/top cover 501, some of the same functionality can be achieved by using a sheet metal antenna element 557 connected to the PCB and placed in the inside of the plastics front part/top cover 501 to achieve a distance to the PCB and ground plane. This embodiment, however, requires a larger overall volume to achieve the same principal antenna range as the embodiments using a metal front part/top cover FIG. 2, 3, 4, but the same basic principles apply.

To improve cosine response of the UV-sensor an optical diffuser material cover must be applied. The most commonly used material for this purpose is PTFE which poses challenges because it does not adhere well to other materials due to its low surface energy. The invention embodies four different solutions to this. FIG. 3 shows a small diffuser/window 309 made from PTFE with watertight press-fit assembly into a hole in the middle member at a location thereof below the front part 301.

Figure 4:
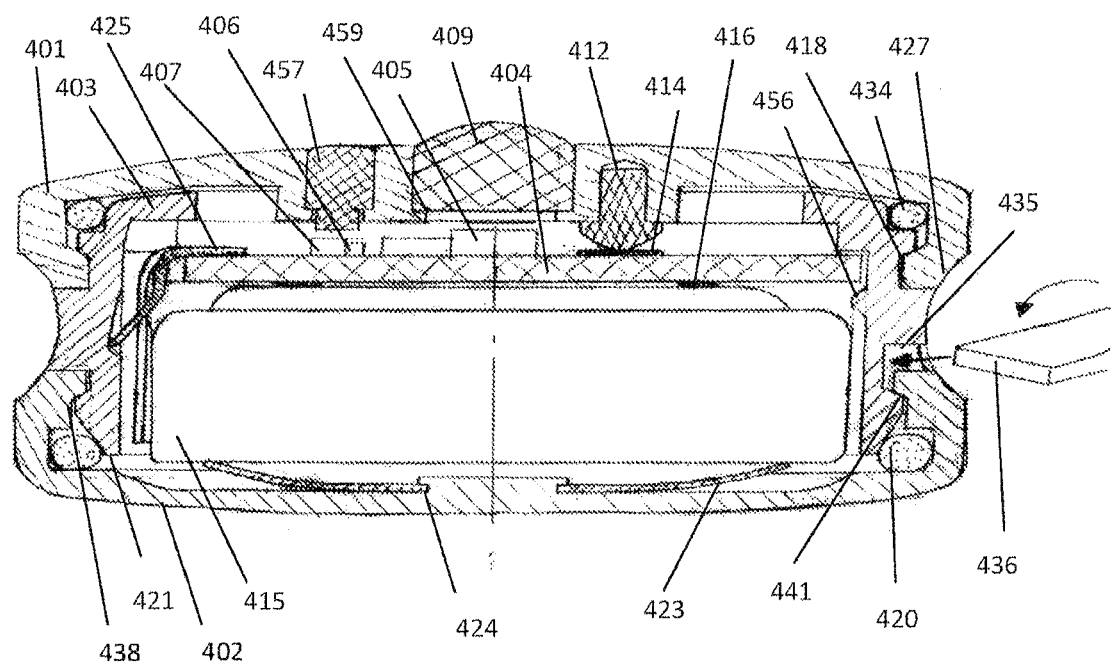

FIG. 4 shows an alternative embodiment where the diffuser/window 409, is press-fitted watertight into a hole in the metal front part/top cover 401. A flange 459 controls insertion depth and distance to sensor 405. The same principle can be applied for a second, similar diffuser/window over a visible light/RGB sensor. Likewise, a plastics transparent lens 457, can be press-fitted watertight into the metal front part/top cover to provide optical access for interface LED 407, 507 and possibly an ambient light sensor 406, 506. The middle member 403 is then sealed against the front part/top cover 401 by an O-ring 434 or glue.

FIG. 2 shows a cost efficient embodiment of the invention where the molded polymer middle piece 203 forms a closed compartment around the PCB 204 and, in addition to the self-sealing contact pin 212, only needs sealing against the rear part/bottom cover 202. This is done by an O-ring 220, 420 or a compressible gasket, 548 sealing against a middle member ridge surface 441, or a lip 321 molded as an integral part of middle piece 203, 303, 403, being compressed by, and sealing against a conical surface 339 in rear part/bottom cover 302.

In the embodiment shown in FIG. 2, the window 208, can be used for visible light sensor(s) 206 as well as one or more LEDs 207 for user interface in addition to UV-sensor(s). In the embodiment shown in FIG. 2 inside of window is provided with a small undercut flange 211 that holds a diffuser disc 209 in place, possibly also a shade part 210 that protects the sensors from stray light. A secondary PCB 270 is used to elevate the sensor 206 and possibly the LED 207 closer to the diffuser 209 and window 208. This affects the cosine response and viewing angle of the sensors and is an important and integral part to achieve a smooth outer surface of the product with desired cosine response and sensor viewing angle combined with automated Surface Mount assembly of the components. This solution, however, does not fully take into consideration the effect of varying UVA/UVB ratio mentioned later in this document.

The invention comprises a contact spring 225, 325, 425, 525, soldered onto the PCB 204, 304, 404, 504 to maintain contact with the battery positive pole. In the embodiment shown in FIG. 2, the contact spring 225, has a second finger 226, 601, pushing outwards onto middle member 203 with an angle between contact spring finger 226, 601 and middle member 204 inside surface of 20-45 deg. This allows the PCB to be easily moved vertically inside the middle member by the disc spring 223, 523 ensuring electrical contact between the PCB contact pad 214 and the contact pin 212, while preventing it from falling out during battery replacement. The contact spring further comprises two flexible members 602 connected to two fingers 603 that contacts the battery positive can. Two folded index tabs 604 will position the spring into index holes in PCB without protruding through the PCB contacting the battery negative terminal. This ensures accuracy and robustness during soldering process.

Pairing and Authentication Procedure

A method of establishing a secure wireless connection between a wearable or other Bluetooth-equipped device 860, implementing UV-sensors and a smartphone 861, 1114 initialization signal to start the connection/pairing process and an authentication code to ensure connection is done between the correct devices should be provided. For this purpose, the relevant device 860 has a photo sensor with a window 864 capable of reading at least parts of the visual spectrum of light.

Figure 8:
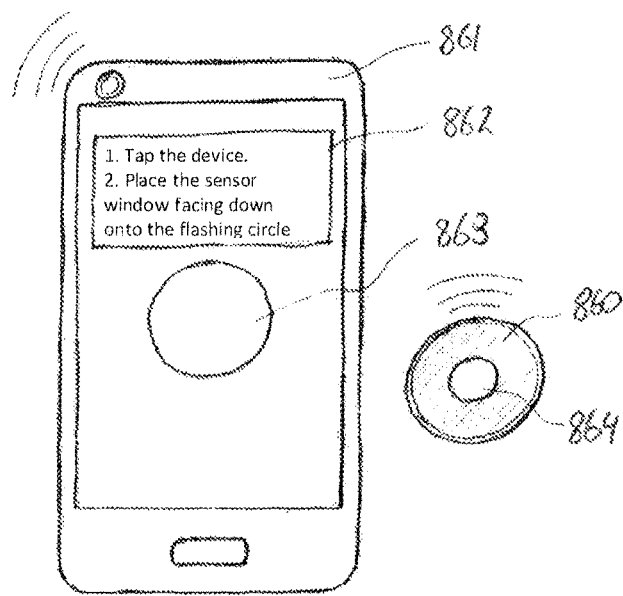
Figure 11:
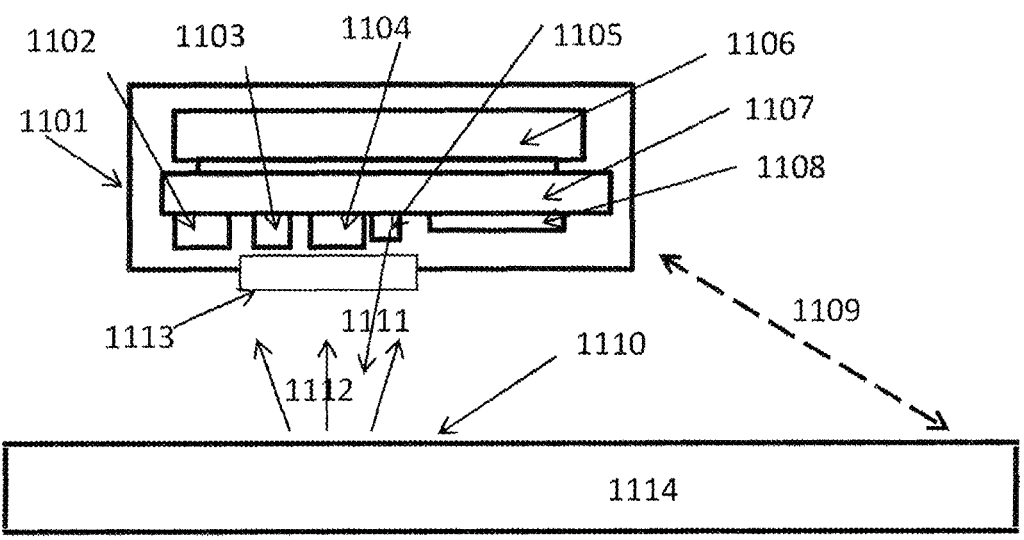
FIG. 11 is a block-schematic diagram of the pairing and authentication solution.
Figure 12:
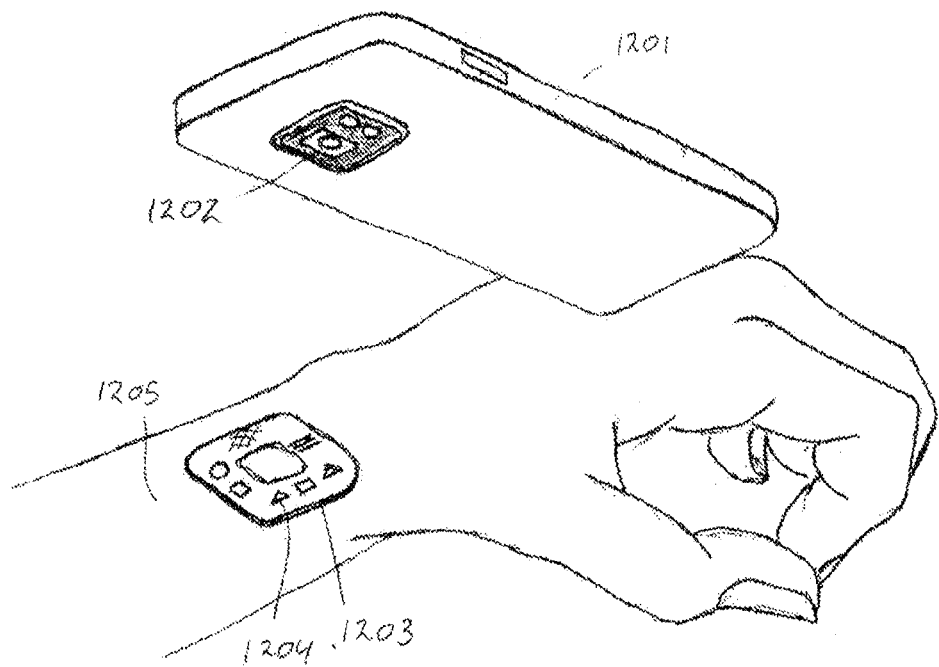
FIG. 12 shows a method of using a smartphone camera and reference patch sticker for quantifying skin type.

FIG. 11 shows a schematic diagram of such a device with housing 1101 holding a transparent window, an accelerometer 1102 or other sensor for environmental input from user, a visible light photo sensor 1103, a possible UV-sensor 1104, possible RGB-LED 1105 and a µP 1108, mounted onto a PCB 1107 powered by a battery 1106. For some period after power on or a user input—this could be detected by tapping the previously described piezo-ceramic sensor, the device will then read this light sensor 1103 at short intervals for a limited time after initiation. A smart phone App accompanying and applicable to the relevant wireless device provides for an interface incorporating a flashing area 863, 1112 on the display, see FIGS. 8 and 11. The App is able to provide instructions 862 the user to place the device with the sensor window 864 facing down onto the flashing area 863, 1112. The instructions could e.g. read "Place device sensor side down onto flashing area to connect with phone". The flashing sequence is modulated and is recognized by the µP 1108 of the device 860 which will initiate a Bluetooth communication 1109 pairing procedure between the device 860, 1101 and the smartphone 861, 1114. A further, unique code can then be transmitted from the smartphone 861, 1114 (using the applicable App) to the device 863, 1101 by modulating at flashing area 863, 1112 the flashing and comparing with a code sent via the established radio connection 1109 to verify that correct device(s) being connected.

An advantage of this invention is that it does not require any further user interaction for the verification. To the user, it will have a similar function to the established Near Field Communication system, but being based on optics rather than short range radio communication. Compared to the Near Field Communication system, it is an advantage of the present invention that on a slave device side it uses a compact optical sensor rather than a significantly larger radio frequency antenna, in addition to being compatible with all Bluetooth equipped smart phones as it uses the standard main display of the smartphone for communication rather than require a dedicated antenna and Near Field Communication system. It is a further advantage of the present invention that it reduces total power consumption, as the condition of detected flashing light sequence has to be detected before the more power consuming Bluetooth communication pairing procedure is activated, thereby preventing unintended activation of the latter.

The invention provides for the possibility two-way optical communication, i.e. using in the device 863, 1101 visible light RGB-LED 1105, for transmitting small amounts of data to an external receiver that could be the smartphone 1114, 861 camera or a special purpose camera or photo sensor used in calibration or testing of the device in production. An example is slow mode color flashing from a smartphone screen in carrying out a specific authentication procedure between the device and the smartphone.

PCB

Figure 9:
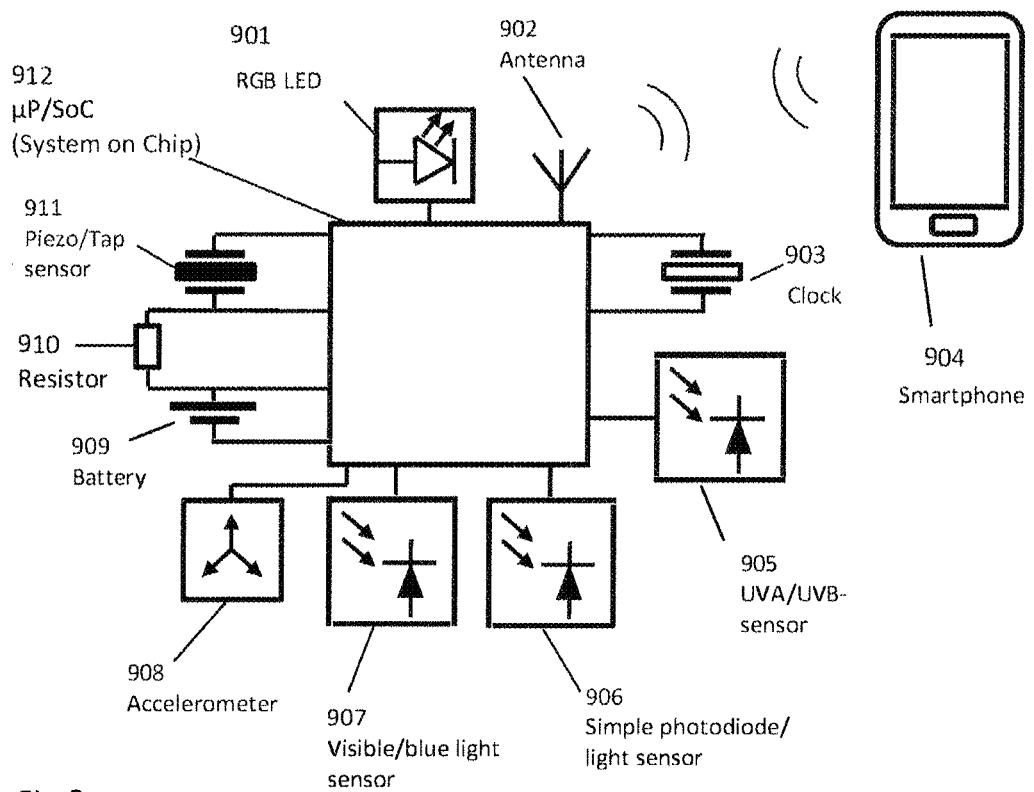
FIG. 9 is a block-schematic diagram of the device.

FIG. 9 shows a block-schematic circuit diagram where the central µP or System-On-Chip is connected to a UVA/UVB sensor by a standardised communication bus, e.g. I2C type. In addition, it can be similarly connected to another sensor for visible light that will read the modulated flashing light from the smart phone display during connection procedure, or it can be connected to a simpler, analogue photodiode/ambient light sensor for the single purpose of connection procedure.

A wake-up signal is generated by either a piezo element 253 connected as shown or a commercially available accelerometer/crash sensor. The latter may require an external clock to reduce power consumption during sleep. An RGB LED is used for direct user notification/feedback, while the antenna transmits and receives data communication to/from a smartphone with a belonging software application installed.

Device ID Based App Customization

Figure 10:
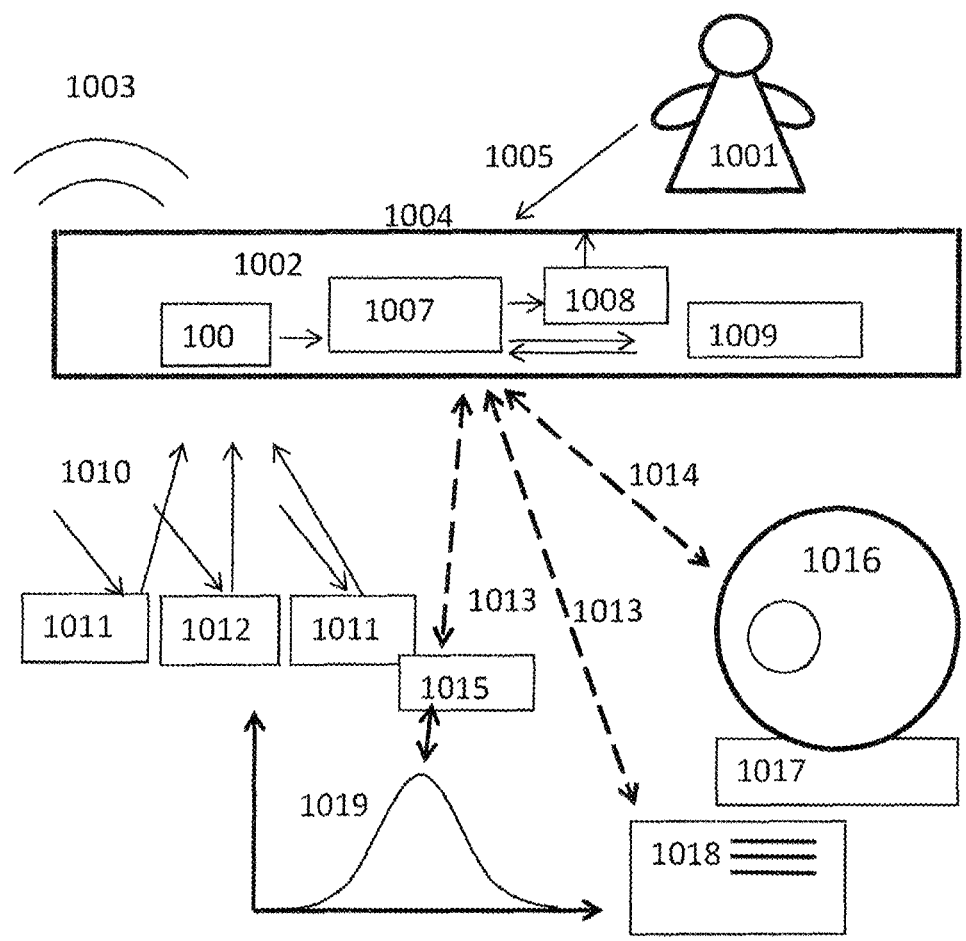
FIG. 10 is a block-schematic diagram of a system comprised of a wearable, Bluetooth enabled UV-sensing device, a method of analyzing and quantifying a person's skin type, and a back-end system enabling retailer-based customization of a system application, so-called "App".

This invention also comprises a solution in which wireless, wearable devices, Bluetooth equipped UV-sensors in particular, are registered with device unique ID upon shipping to wholesale dealer. When the end user downloads, installing the accompanying app on his/her smartphone and connecting to a wireless device, the App will match the device ID against a central database of ID numbers registered on wholesale dealers/customers and display customized skins, logos, interfaces, other graphical elements, text or adverts to the user depending on through wholesaler the actual device has been sold. This is illustrated in FIG. 10.

A smartphone 1002 runs a software app in displaying a graphical user interface on the screen 1004, that can be interacted with 1005 by a person/user 1001. The app can also use a speaker of the smartphone to communicate or alert a user by sound 1003. A wearable, Bluetooth equipped device 1016 is connected to the phone by a radio link 1014, e.g. Bluetooth and transmits a unique identification code 1017 to the app. This unique code is typically a serial number. on device/packaging suited for machine scanning upon shipping to customer, such as Bar-code, QR-code or Near Field Communication code or Bluetooth/MAC address. 1015, that looks up the identification code in a central register 1018 containing sold wearable unit's unique identification codes, what wholesaler/distributor it is sold to and a table of customer specific app-skins, logos, adverts and info-text to be displayed by the app. The relevant information is then relayed back to the app and used for customizing the displayed interface 1004.

The figure also illustrates how the app can send a request by an internet communication link 1013 to an Application Program Interface 1015 on a central server which will return information about local UV forecast from a central, frequently updated database 1019 possibly covering all of Earth.

This solution provides a unique and cost effective way of digitally branding and customizing a standard product to many wholesale customers or companies wanting profile- or gift products or want to promote their own brand and internet store solutions.

Smartphone Based Skin Type Classification

The invention comprises a solution enabling a high-quality camera 1006, 1104, 1202 of a smartphone 1002, 1114, 1201 with associated Central Processing Unit 1007 and potentially separate Graphical Processing Unit 1008 to be used in conjunction with an App to take a picture of the skin 1012, 1205 to determine the skin-type with better accuracy on the Fitzpatrick scale than can be obtained without instrumental means.

A special purpose printed sticker 1011, 1203 with graphical elements 1204 is placed onto the skin when taking picture. The image-analyzing algorithm of the App will then compare picture segments of the skin 1012 with those of the pre-defined sticker 1011. In addition to analyze the lighting conditions 1010 and calibrating the camera for white balance, ambient light color and strength, as well as colored and greyscale areas on the sticker, dedicated areas on the sticker can be covered by ink which reflects light at characteristic reflectance wavelengths for oxygenated hemoglobin, bilirubin and/or other chemicals that have characteristic spectra, some of which that contrast the broad absorption spectrum of the melanin polymer and enables the app to better analyze the pigmentation and other skin type relevant properties of the skin and compare it against a table of references in the memory 1009 or online on a central server. This analysis result, in the form of a set of numerical values, is input to an algorithm combining this with user input data of age, sex (male or female), prior exposure and tanning history, relevant medical conditions, eye and hair color to calculate the skin type as a numerical value. This value is then used in the App to determine maximum recommended UV-dose and time in the sun at a given UV-level and possibly with given sunscreen factor applied.

Optimization of Sensor Output for Use in a Wearable Device

Figure 15:
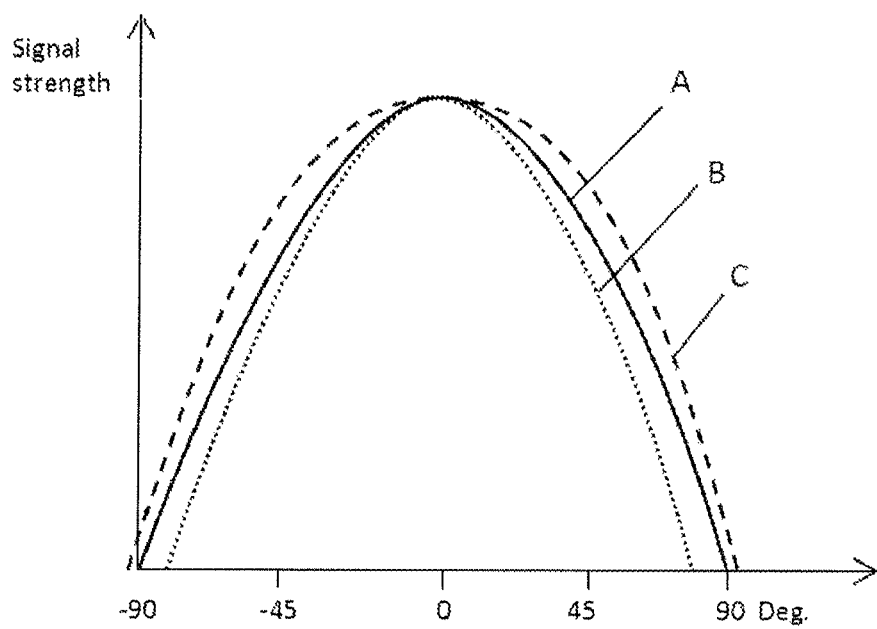
FIG. 15 shows different sensor and diffusor angular response curves relative the theoretical cosine curve.
Figure 16:
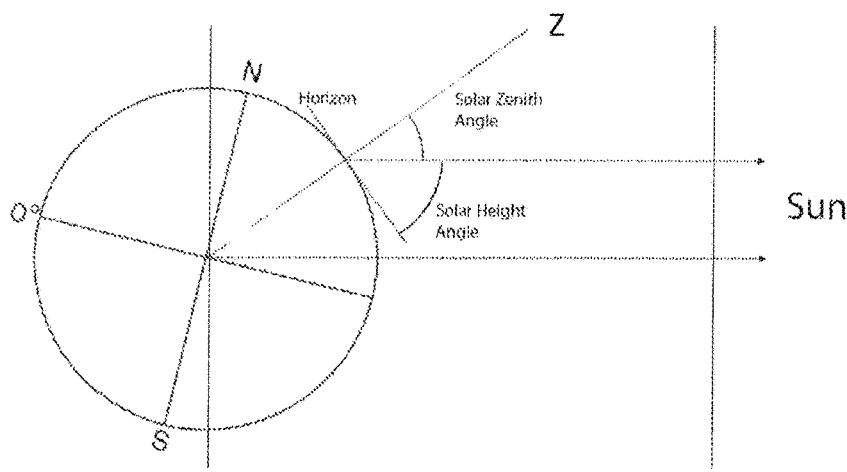
FIG. 16 is a schematic illustration of solar height angle or elevation impact on UVA and UVB radiation.
Figure 17:
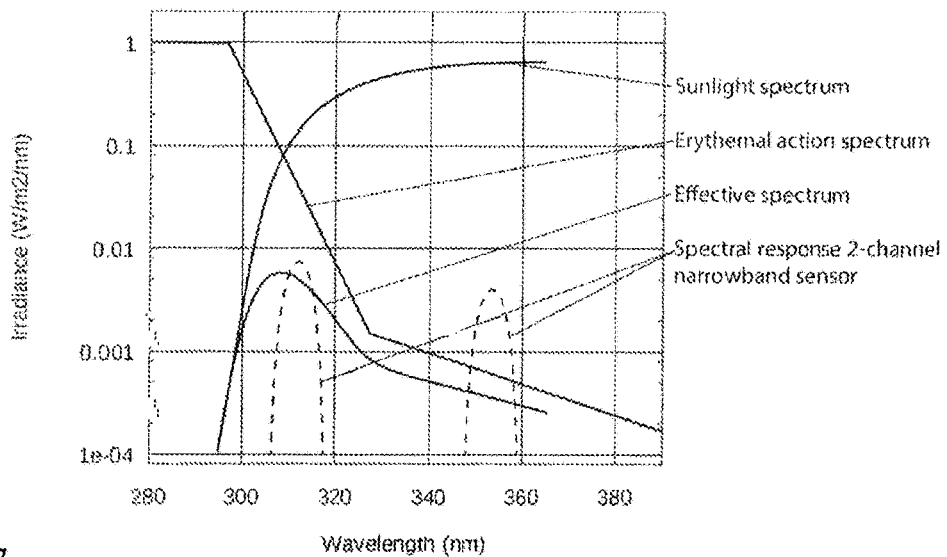
FIG. 17 shows the sunlight spectrum distribution, erythema action/weighing spectrum and a typical 2-channel narrowband sensor response.

The UV-index is defined as a linear scale measurement of the spectral power of sunburn-producing UV radiation weighted according to the erythema action spectrum shown in FIG. 17. This is to be measured by a vertically directed sensor with an angular response to the incoming solar radiation according to the mathematically correct cosine function of solar zenith angle between 0 and 90 degrees as shown in FIG. 15 by curve A Curve B shows the angular response of a common broadband UVI-sensor which will typically be narrower than the theoretical cosine curve A. Expensive sensors for scientific use will typically be close to curve A.

Figure 13A:
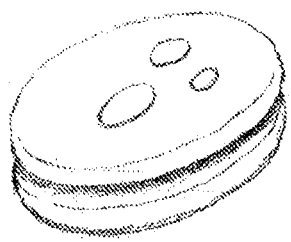
FIG. 13a-c show three different embodiments of the invention having one, two or three separate windows for optical sensors and user interface-LED and detailed drawings of a convexly shaped diffuser window.
Figure 13B:
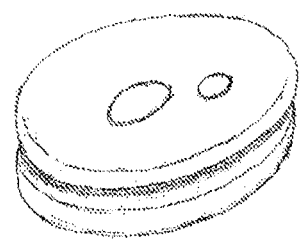
Figure 13C:
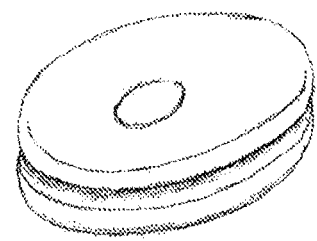
Figure 13D:
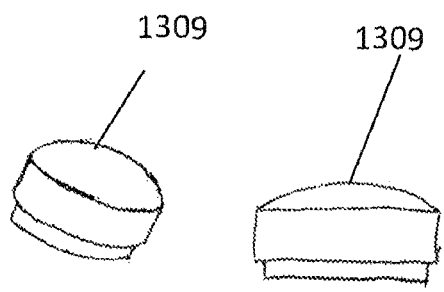
FIGS. 13d and 13e show an outward convexly shaped diffusor for opitimizing the angular response for a wearable ultraviolet radiation sensing device.
Figure 13E:
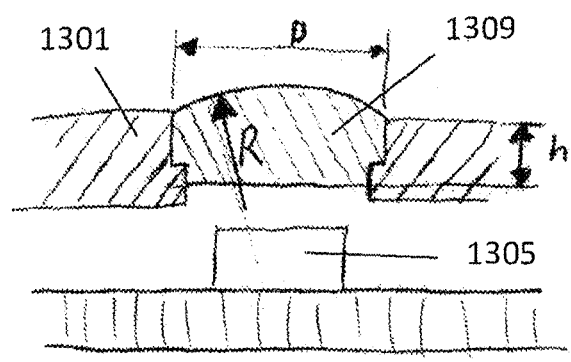
Figure 14:
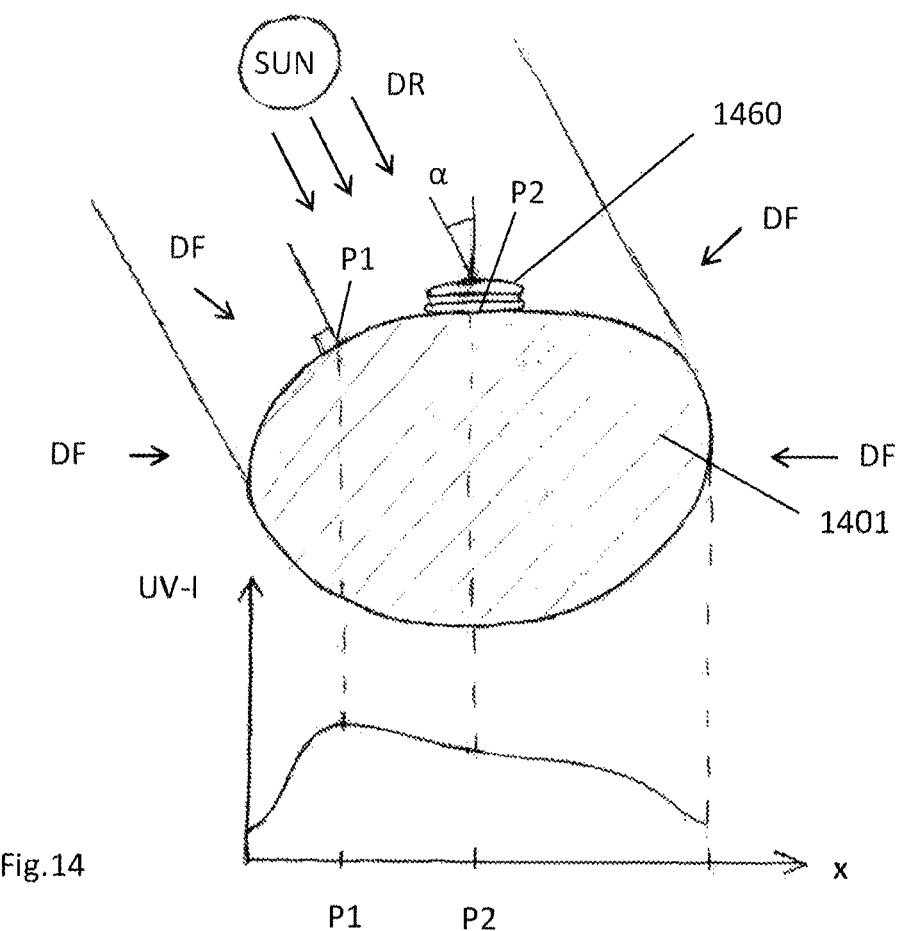
FIG. 14 is a schematic illustration of a sensor device placed on an arm and distribution of solar radiation exposure.

Referring to FIG. 14, when tracking the accumulated, erythema weighted UV-dose on the body of an active person over a period of time, here illustrated by a cross section of an arm 1401, a sensor device 1460 placed at location P2 is likely to have a larger average angle, α, to the line of sun direction than the most exposed part of the body denoted as location P1 in the drawing. The total ultraviolet radiation is roughly the sum of direct radiation, DR, from the sun, and diffuse radiation, DF, from the rest of the celestial sphere and reflected off from surroundings. A sensor angular response like curve C in FIG. 15 will yield higher readings when sensor direction is at an angle α from the direct line of sun, thus providing a more conservative measurement and alerting of risk of sunburn without measurements overshooting actual UV-level when pointed towards the sun. This function is achieved by using a diffuser 309, 409, 509, 1309 protruding through a hole in the front part/top cover 301, 401, 501, 1301 and exhibiting a convex or -partially hemispherical surface. The response curve angular overshoot effect is governed by spherical radius or curvature R, cylindrical diameter D and height h shown in FIG. 13e. As a non-limiting example, D could be in a range of 3-7 mm, R could be in the range 5-25 mm, and h could be in a range of 1-3 mm.

Figure 18:
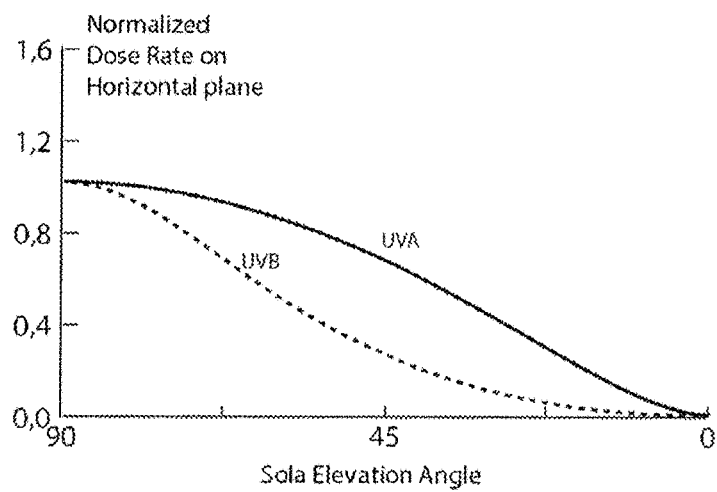
FIG. 18 shows how UVA and UVB intensity on a horizontal plane varies with solar height/elevation.

The invention comprises a solution for correcting the measurements taken by a low cost UV-sensor with limited accuracy by using data relayed through a connected smartphone. At ground level, the ratio of irradiance caused by UVB-spectrum radiation and UVA-spectrum radiation will vary with ozone layer concentrations, but also with other atmospheric conditions like pollution, clouds, haze and with solar height angle as shown in FIG. 18. This effect can cause significant errors in the measured UVI-level (UV intensity level) on low cost sensors as the UVB/UVA ratio will be different from that used in calibration of the sensors and because such sensors have a spectral response curve that differs from the erythema action spectrum curve as shown in FIG. 17. In particular this is the case when output from multi-channel sensors covering narrow wavelength bands are used to calculate and estimate UVI because UVB radiation is weighted much stronger than UVA in the erythema action spectrum.

The solar height angle can be calculated from geographic longitude, latitude, date and time available on the smartphone 1461 either via GPS-system 1469 or by Wi-Fi or mobile network cell info. Elevation above sea level can also be retrieved by a smartphone and used for calculate atmospheric impact on UV radiation as higher altitudes will in particular allow a higher portion of UVB radiation through to the measuring device. The resulting calculated solar height and UVB/UVA ratio is then relayed from the smartphone 1461 to a Bluetooth and UV-sensor equipped wearable device 1460 and used to correct the measured spectral power from the UV-sensor or sensors when calculating UVI and accumulated exposure.

A further correction and improved accuracy can be achieved by using data on regional ozone layer concentration, pollution, clouds, haze and related UVI-forecasts provided by metrological organizations retrieved from an Application Programming Interface 1415 typically provided by metrological institutions or other sources available via an internet communications link 1413. These data are put into an algorithm providing a further correction value multiplied to the sensor readout. Because different sensors will have different spectral response curves, the algorithm needs to be sensor specific.

The invention can also be used to calculate actual UVI and accumulated exposure from a Bluetooth equipped wearable device equipped with a visible light sensor instead of or in addition to a UV-sensor. Application Programming Interface used also can provide estimated or forecasted clear sky UVI levels based on location and time. Using this to correct a correlation formula between measured visible light intensity and UVI, the latter can be estimated. This method can be used as a cost reducing method where the wearable device does not have an ultraviolet radiation sensor, or a power saving method where measurements by ultraviolet radiation sensor are spaced further apart in time aided by a number of less power consuming visible light measurements and belonging estimations of ultraviolet radiation levels in between.

Figure 19:
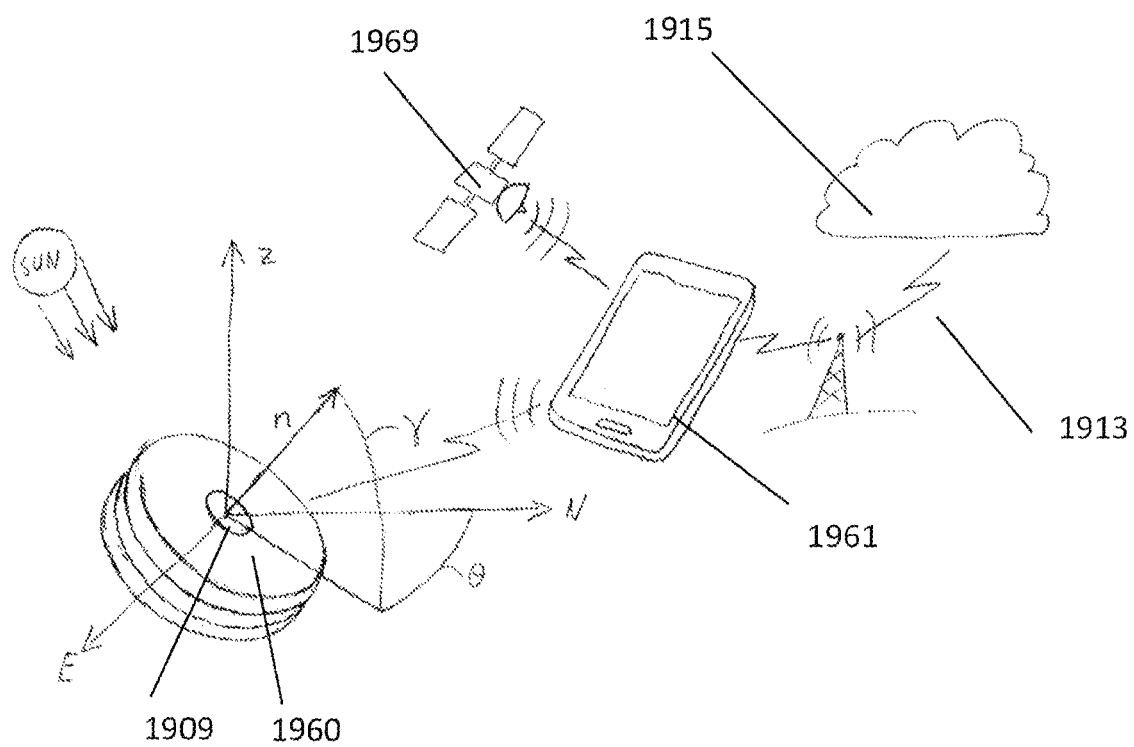
FIG. 19 is a schematic presentation of sensor tilt and azimuth angle and connected services.

The invention comprises a further improvement on sensor measurement correction accuracy by incorporating a 3-axis (Z, N and E) accelerometer and magnetometer inside the Bluetooth equipped wearable device 1960. These sensors will provide data to compute tilt angle γ and azimuth angle θ of the sensor normal vector n as shown in FIG. 19. Together with calculated local solar height and azimuth angles, the measured and calculated/forecasted UV-level for a large number of orientations and timestamps can be mapped and used to further enhance the accuracy of corrections done to the sensor output values.

When logged over time, a large number of these compared data can be used to detect and warn the user about possible sensor drift or malfunction.

The invention claimed is:

1. A method of calibrating sun exposure features and determining skin-type of a human being in application data of a smartphone cooperative with an ultraviolet light sensing device,
   wherein a special purpose sticker having graphical elements thereon is applied onto the skin of the human being,
   wherein a camera of the smartphone is used to take a combined picture of the sticker and of the skin of the human being,
   wherein the application data provide for calibration of the smartphone camera regarding at least white balance, ambient light color, intensity and reflectance, and
   wherein pigmentation of the skin as detected by the smartphone camera is analyzed against a table of skin-types to define the skin type of the human being as a numerical value.

2. The method of claim 1, wherein the numerical value is refinable by adding thereto parameters of the human being selectable from one or more of: age, sex (male or female), prior sun exposure and tanning history, any relevant medical condition or side effects of medication used, eye conditions, and color of eyes and hair.

3. The method of claim 1, wherein the numerical value is used to determine recommended maximum UV-dose and related time in the sun at default UV-level, and wherein the recommended maximum UV-dose and related time in the sun is also related to a sunscreen factor of sun bathing oil applied to the human skin.

4. The method of claim 1, wherein recommended maximum UV-dose and related time in the sun is communicated to the sensing device.

* * * * *